United States Patent
Yasuda et al.

(10) Patent No.: US 10,065,515 B2
(45) Date of Patent: Sep. 4, 2018

(54) SYSTEM FOR WIRELESSLY SUPPLYING POWER DURING MOVING

(71) Applicant: TECHNOVA INC., Tokyo (JP)

(72) Inventors: Tomio Yasuda, Saitama (JP); Hiroyuki Kishi, Tokyo (JP); Isami Norigoe, Tokyo (JP)

(73) Assignee: TECHNOVA INC., Tokyo (JP)

( * ) Notice: Subject to any disclaimer, the term of this patent is extended or adjusted under 35 U.S.C. 154(b) by 37 days.

(21) Appl. No.: 15/123,013

(22) PCT Filed: Mar. 4, 2014

(86) PCT No.: PCT/JP2014/055523
§ 371 (c)(1),
(2) Date: Sep. 1, 2016

(87) PCT Pub. No.: WO2015/132890
PCT Pub. Date: Sep. 11, 2015

(65) Prior Publication Data
US 2017/0158064 A1    Jun. 8, 2017

(51) Int. Cl.
*B60L 11/18* (2006.01)
*B60L 5/00* (2006.01)
(Continued)

(52) U.S. Cl.
CPC ............. *B60L 11/182* (2013.01); *B60L 5/005* (2013.01); *B60L 11/1811* (2013.01);
(Continued)

(58) Field of Classification Search
CPC .... B60L 11/182; B60L 11/1811; B60L 5/005; B60L 2210/30; H02J 50/12; H02J 50/40; H02J 7/025
See application file for complete search history.

(56) References Cited

U.S. PATENT DOCUMENTS

2010/0259217 A1    10/2010    Baarman et al.
2012/0161530 A1    6/2012    Urano
(Continued)

FOREIGN PATENT DOCUMENTS

CN    102625750 A    8/2012
CN    103339698 A    10/2013
(Continued)

OTHER PUBLICATIONS

International Search Report dated Jun. 3, 2014 in PCT/JP2014/055523.
(Continued)

*Primary Examiner* — Jason C Smith
(74) *Attorney, Agent, or Firm* — Rothwell, Figg, Ernst & Manbeck, P.C.

(57) ABSTRACT

On the ground, a plurality of primary power supply transformers are separately installed with a longitudinal direction of magnetic poles matching a vehicle traveling direction. The primary power supply transformers each include a double-sided coil with an H-shaped core around which a wire is wound. On a vehicle, a secondary power supply transformer including an H-shaped core is mounted with a longitudinal direction of magnetic poles matching a vehicle front-back direction. The distance between the primary power supply transformers is set such that the distance between the centers of the magnetic poles of the neighboring primary power supply transformers does not exceed 3D where D represents the size of the magnetic poles.

7 Claims, 13 Drawing Sheets

(51) Int. Cl.
  *H02J 7/02* (2016.01)
  *H02J 50/12* (2016.01)
  *H02J 50/40* (2016.01)

(52) U.S. Cl.
  CPC .............. *H02J 7/025* (2013.01); *H02J 50/12* (2016.02); *H02J 50/40* (2016.02); *B60L 2210/30* (2013.01)

(56) References Cited

U.S. PATENT DOCUMENTS

| | | | | |
|---|---|---|---|---|
| 2012/0217111 | A1* | 8/2012 | Boys | H01F 38/14 191/10 |
| 2012/0248892 | A1 | 10/2012 | Covic et al. | |
| 2013/0285463 | A1* | 10/2013 | Covic | H01F 27/346 307/104 |
| 2013/0320759 | A1* | 12/2013 | Abe | H01F 38/14 307/10.1 |
| 2014/0084697 | A1* | 3/2014 | Yasuda | B60L 11/182 307/104 |
| 2015/0155094 | A1* | 6/2015 | Yasuda | H01F 38/14 361/270 |
| 2016/0126750 | A1* | 5/2016 | Yasuda | H02J 5/005 307/104 |
| 2016/0134154 | A1 | 5/2016 | Baarman et al. | |
| 2017/0158064 | A1* | 6/2017 | Yasuda | B60L 11/182 |

FOREIGN PATENT DOCUMENTS

| | | |
|---|---|---|
| EP | 0 666 804 A1 | 8/1995 |
| EP | 2 594 425 A1 | 5/2013 |
| JP | 64-30403 A | 2/1989 |
| JP | 7-43806 U | 9/1995 |
| JP | 2002-143334 A | 5/2002 |
| JP | 2005-289101 A | 10/2005 |
| JP | 2008-283791 A | 11/2008 |
| JP | 2009-284696 A | 12/2009 |
| JP | 2010-172084 A | 8/2010 |
| JP | 2011-50127 A | 3/2011 |
| JP | 2011-166992 A | 8/2011 |
| JP | 2012-143131 A | 7/2012 |
| JP | 2012-151311 A | 8/2012 |
| JP | 2012-175793 A | 9/2012 |
| JP | 2012-523814 A | 10/2012 |
| JP | 2013-501665 A | 1/2013 |
| JP | 2014-17973 A | 1/2014 |
| WO | 2013/176151 A1 | 11/2013 |
| WO | 2014/010147 A1 | 1/2014 |

OTHER PUBLICATIONS

Jinwook Kim et al., "Wireless Power Transfer for Free Positioning using Compact Planar Multiple Self-Resonators" 2012 IEEE MTT-S International IMWS-IWPT 2012 pp. 127-130.

The extended European search report dated Dec. 13, 2017 in corresponding EP Patent Application No. 14884347.7 (9 pages).

The First Office Action dated Feb. 1, 2018 in corresponding Chinese Patent Application No. 201480076751.X (with an English translation) (10 pages).

Notification of Reasons for Refusal dated Jul. 12, 2016 in corresponding Japanese Patent Application No. 2013-013066 (with an English translation) (6 pages).

Decision of Refusal dated Feb. 24, 2017 in corresponding Japanese Patent Application No. 2013-013066 (with an English translation) (4 pages).

Decision to Grant a Patent dated Jun. 13, 2017 in corresponding Japanese Patent Application No. 2013-013066 (wit an English translation) (5 pages).

* cited by examiner

SYSTEM FOR WIRELESSLY SUPPLYING POWER DURING MOVING

CROSS REFERENCE TO RELATED APPLICATION

This application is a 35 U.S.C. 371 National Phase Entry Application from PCT/JP2014/055523, filed Mar. 4, 2014, which designates the United States, the disclosure of which is incorporated herein in its entirety by reference.

TECHNICAL FIELD

The present invention relates to a power supply system for contactless power supply to a running mobile structure.

BACKGROUND ART

Conventionally, contactless power supply systems for charging the batteries of electric automobiles or plug-in hybrid cars have been developed. One of such systems includes a secondary coil (receiver coil) 102 of a contactless power supply transformer mounted on a vehicle floor and a primary coil (transmitter coil) 202 provided on the ground which oppose each other to supply power from the ground to a stopping vehicle in contactless manner, as shown in FIG. 13.

The following patent document 1 (Japanese Patent Laid-open Publication No. 2010-172084) discloses the use of a double-sided coil formed of a plate-like ferrite core 10 around which a wire 11 is wound, as shown in FIG. 14, aiming for raising a tolerance for misalignments or gap variations between a primary coil and a secondary coil of the charging system and downsizing the coils. In this double-sided coil, a primary magnetic flux passes through the ferrite core 10, entering and exiting into/from magnetic poles at both ends.

The following patent document 2 (Japanese Patent Laid-open Publication No. 2012-175793) discloses a coil including a H-shaped ferrite core, as shown in FIG. 15, which has been developed for further reducing the size and weight of the double-sided coil. In this coil a wire 11 is wound around the portion of the H-shaped core corresponding to a transverse bar while the parallel portions of the H-shaped core at both sides work as magnetic poles.

The patent document 2 further discloses that the tolerance for misalignments is set to be larger along the line (x-direction) parallel to both magnetic poles than along the line (y-direction) orthogonal to the magnetic poles.

Currently, electric automobiles face a problem in a relatively short driving range per charging because of a battery performance. In view of solving the problem, various kinds of contactless power supply systems for running vehicles have been devised.

The following patent document 3 (Japanese Patent Laid-open Publication No. 2011-166992) discloses a system in which multiple power supply devices each including an AC source, a high-frequency power driver, a primary coil, a primary self-resonance coil, a power sensor, and an ECU are installed on a driving route to supply power to running vehicles having receiver coils.

The following nonpatent literature 1 (Jin Wook Kim et al., "Wireless power transfer for free positioning using compact planar multiple self-resonators" 2012 IEEE MTT-S International IMWS-IWPT 2012 pp. 127-130) has studied the characteristics of multiple resonators represented by the equivalent circuit in FIG. 16, which are placed following the source coil of a power supply device as shown in FIG. 17, aiming for elongating the power supply intervals of individual power supply devices.

The nonpatent literature 1 reports that as shown in FIG. 18, "dead zones" in which the power supply to secondary coils is interrupted still appear on the primary coils even when closely arranged with no gap as shown in FIG. 17.

The present invention has been made in view of such situations. It is an object of the present invention to provide a contactless power supply system of which a primary side (on the ground) can be installed by simple work and which can ensure longer power supply intervals.

SUMMARY

According to the present invention, a contactless power supply system for supplying power to a running mobile structure from ground in contactless manner, the system comprises: on the ground, a plurality of primary power supply transformers installed on a driving route of the mobile structure; a high-frequency power source which supplies a high-frequency alternating current to the primary power supply transformers via a cable; and a primary series capacitor connected in series to the primary power supply transformers; on the mobile structure, a secondary power supply transformer supplied with power from the primary power supply transformers in contactless manner; a rectifier which rectifies an alternating current received by the secondary power supply transformer for charging; and a secondary resonance capacitor connected in series or in parallel between the secondary power supply transformer and the rectifier, wherein the primary power supply transformers and the secondary power supply transformer each include a double-sided coil having a core with magnetic poles at both ends and a portion between the magnetic poles around which a wire is wound, and the primary power supply transformers and the secondary power supply transformer are installed on the driving route or on the mobile structure such that a direction of a line parallel to the magnetic poles at both ends of the core matches a traveling direction of the mobile structure; and the primary power supply transformers are separately installed with a spacing along the driving route, the spacing being set such that a distance from a center of the magnetic poles of the primary power supply transformer to a center of the magnetic poles of a neighboring primary power supply transformer does not exceed 3D where D represents a size of the magnetic poles of the primary power supply transformers in the traveling direction.

In such a system the primary power supply transformers disposed on the driving route are made of double-sided coils having a larger misalignment tolerance and they are aligned in the direction (along the line parallel to the magnetic poles at both ends of the core) of the double-sided coils with the larger misalignment tolerance. Because of this, no interruption of the power supply from the primary power supply transformers to the secondary coil occurs even if the primary power supply transformers are arranged in a stepping stone-like form.

Further, in the contactless power supply system of the present invention, the primary power supply transformers can be connected in series to the high-frequency power source.

The primary power supply transformers connected in series are more easily wired and installed on the driving route by a simple work.

In this case, the primary series capacitor can be connected in series only between the high-frequency power source and one of the primary power supply transformers connected to the high-frequency power source.

When the secondary resonance capacitor is connected in series, the value of capacitance of the primary series capacitor is set such that the primary-side circuit forms a series resonance circuit. Meanwhile, when the secondary resonance capacitor is connected in parallel, the value of capacitance is set such that the primary-side power factor becomes equal to 1.

The primary series capacitor can be divided and connected in series between the high-frequency power source and one of the primary power supply transformers connected to the high-frequency power source and between the neighboring primary power supply transformers, respectively.

In this case, the value of capacitance of each divided primary series capacitor is set to n×C1 where n represents the number of the divided primary series capacitors. When the secondary resonance capacitor is connected in series, the value of capacitance of C1 is set such that the primary-side circuit forms a resonance circuit. Meanwhile, when the secondary resonance capacitor is connected in parallel, the value of capacitance of C1 is set such that the primary-side power factor becomes equal to 1.

According to the system of the present invention, the primary power supply transformers can be also connected in parallel to the high-frequency power source.

In the parallel-connected primary power supply transformers, flows of current concentrate on the one adjacent to the secondary power supply transformer, therefore, it is possible to prevent magnetic flux from leaking from the primary power supply transformers located not opposing the mobile structure.

In this case, the single primary series capacitor is connected between the high-frequency power source and each of the primary power supply transformers connected in parallel to the high-frequency power source.

When the secondary resonance capacitor is connected in series, the value of capacitance of the primary series capacitor is set such that the primary-side circuit forms a series resonance circuit. Meanwhile, when the secondary resonance capacitor is connected in parallel, the value of capacitance is set such that the primary-side power factor becomes equal to 1.

According to the system of the present invention, the core of the double-sided coil is preferably an H-shaped core.

The use of the H-shaped core can contribute to decreasing the size and weight of the primary power supply transformers.

According to the contactless power supply system of the present invention, the primary power supply transformers can be disposed in a stepping stone-like form, therefore, can be installed on driving routes by a simple work. Also, a less number of primary power supply transformers can ensure longer power supply intervals.

BEST MODE(S) FOR CARRYING OUT THE INVENTION

Figure 1:
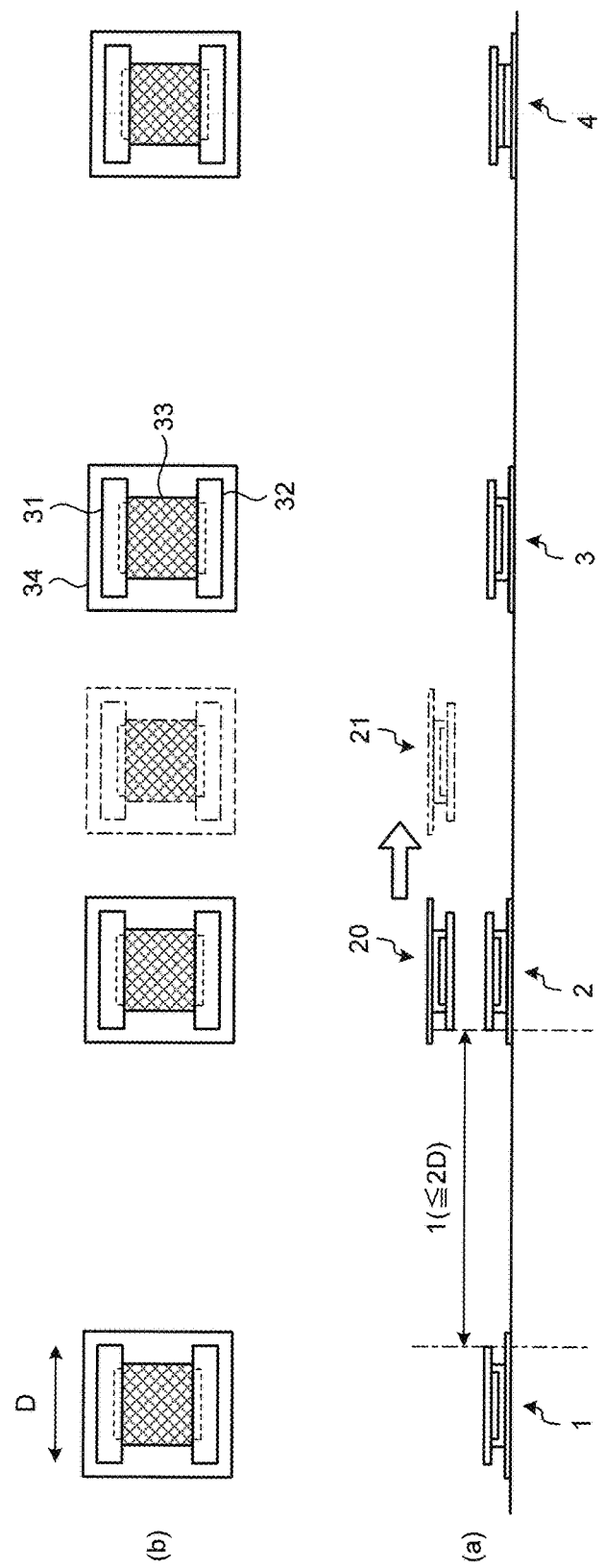
FIG. 1 is a diagram of a contactless power supply system according to the present embodiment.

FIG. 1 shows a contactless power supply system according to one embodiment of the present invention. FIG. 1(a) is a side view of primary power supply transformers 1, 2, 3, and 4 provided separately on a driving route on the ground and a secondary power supply transformer 20 mounted on a vehicle. The reference numeral 21 indicates the secondary power supply transformer 20 when moved. FIG. 1(b) is a plan view of the same.

The primary power supply transformers 1, 2, 3, and 4 and the secondary power supply transformer 20 each include a double-sided coil having an H-shaped core around of which a wire 33 is wound around a portion between magnetic poles 31 and 32, and an aluminum shield plate 34 for shielding from a leakage of magnetic flux which occurs on the sides of the double-sided coil opposite to the faces opposing the other coil.

Figure 15:
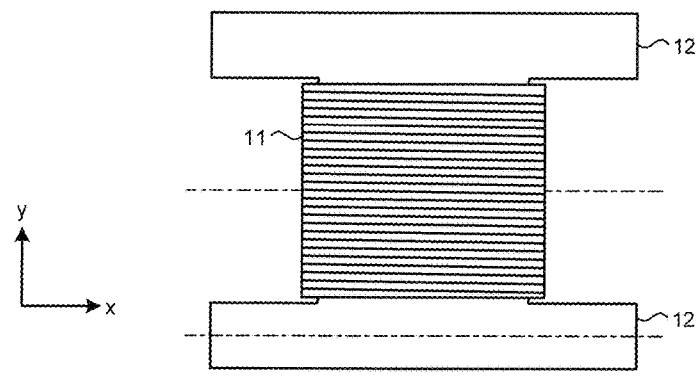
FIG. 15 shows a double-sided coil having an H-shaped core around which a wire is wound.
Figure 16:
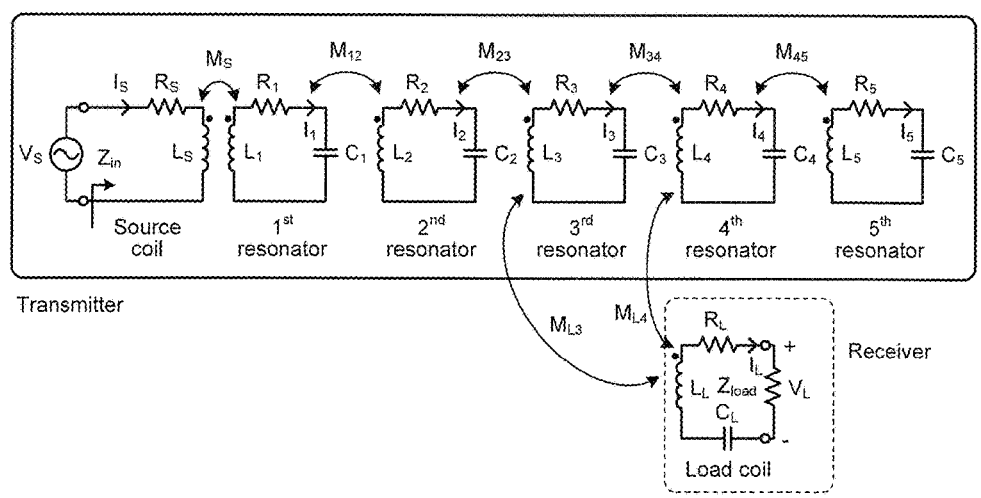
FIG. 16 is an equivalent circuit diagram of a conventional coil, taking power supply during running into account.
Figure 17:
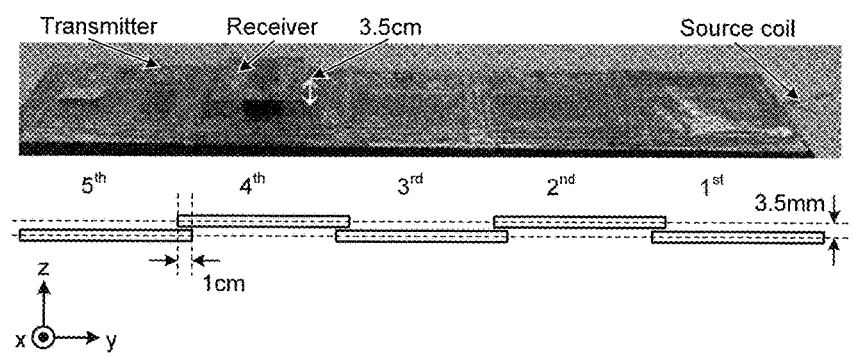
FIG. 17 shows the coil structure having the equivalent circuit in FIG. 16.
Figure 18:
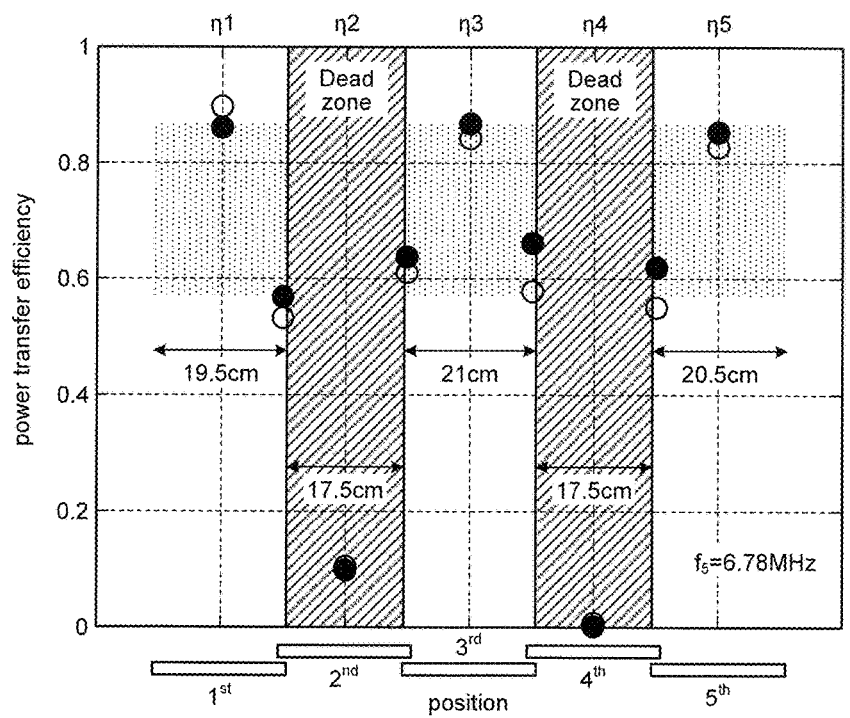
FIG. 18 is a graph showing the results of analysis when using the coil structure in FIG. 17.

The primary power supply transformers 1, 2, 3, and 4 are provided on the driving route so that the direction (x-direction in FIG. 15) of a line parallel to the magnetic poles 31 and 32 matches a vehicle traveling direction on the driving route. The secondary power supply transformer 20 is mounted on the vehicle so that the same direction matches a vehicle front-back direction.

The primary power supply transformers are also separately provided along the driving route with a spacing which is set not to exceed a distance 3D between the centers of the magnetic poles of the neighboring primary power supply transformers where D represents the length of the magnetic poles (that is, the spacing I from the end of the magnetic pole of one primary power supply transformer to that of another primary power supply transformer is set not to exceed 2D).

Figure 2:
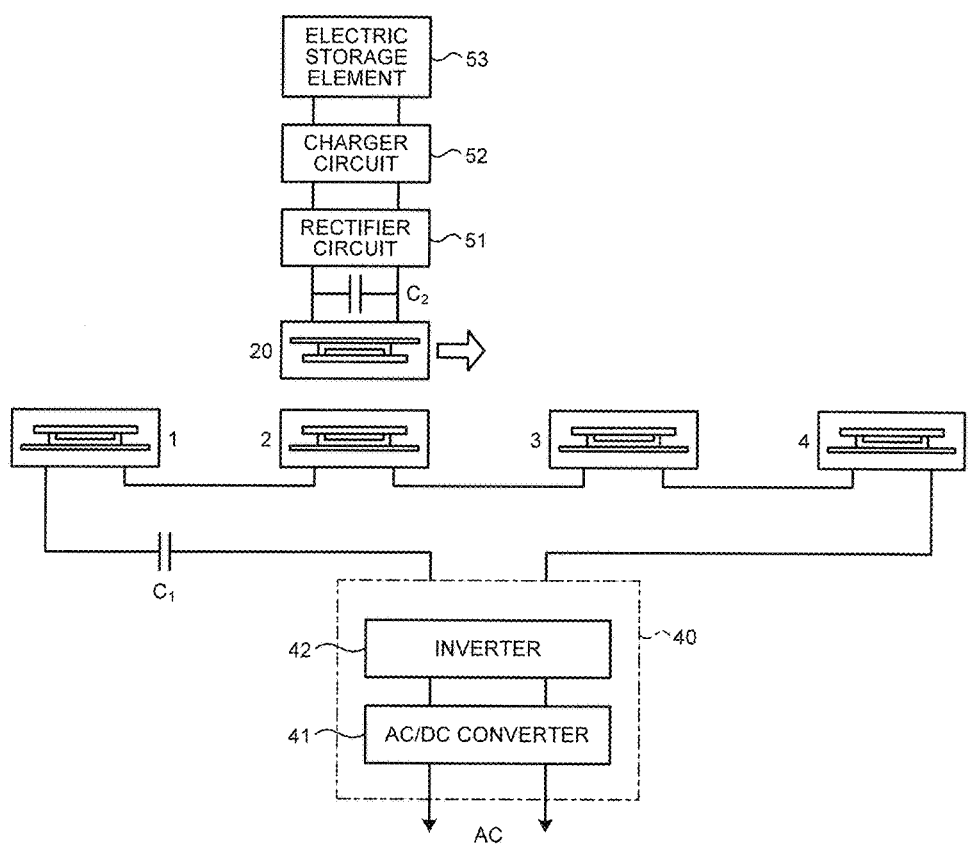
FIG. 2 is a circuit configuration diagram of the system (primary power supply transformers: in series, C1: single, C2: in parallel) in FIG. 1.

FIG. 2 shows one example of the circuit configuration of the contactless power supply system.

The system includes, on the ground, a high-frequency power source 40 to supply a high-frequency alternating current to the primary power supply transformers 1, 2, 3, and 4 and a primary series capacitor C1 connected in series to the primary power supply transformers 1, 2, 3, and 4. The primary power supply transformers 1, 2, 3, and 4 are connected in series to the high-frequency power source 40. The high-frequency power source 40 includes an AC/DC converter 41 to convert the alternating current for commercial power into a direct current and an inverter 42 to generate a high-frequency alternating current from the converted direct current.

The system includes, on the vehicle, a rectifier circuit 51 to rectify the alternating current received by the secondary power supply transformer 20, a charger circuit 52 to charge an electric storage element 53 with the rectified current, and a secondary resonance capacitor C2 connected in parallel between the secondary power supply transformer 20 and the rectifier circuit 51.

The capacitance of the secondary resonance capacitor C2 is defined by the expression (1) so as to form a parallel resonance circuit on the secondary side.

$$C_2 = \frac{1}{\omega^2 L_2}.$$ [Expression 1]

where $\omega=2\pi f$, f: power supply frequency, and L2: secondary self-inductance.

Also, the capacitance of the primary series capacitor C1 is defined by the expression (2) so as to set the primary-side power factor to 1.

$$C_1 = \frac{1}{\omega^2 \left(\frac{a^2 l_0 l_2}{L_2}\right) + l_1}$$ [Expression 2]

where a: winding ratio (=primary winding number/secondary winding number), 10: exciting inductance, 11: exciting inductance, and 12: exciting inductance.

Thus, it is easy to wire the serially connected primary power supply transformers 1, 2, 3, and 4 and install them on the driving route by simple work.

Figure 3:
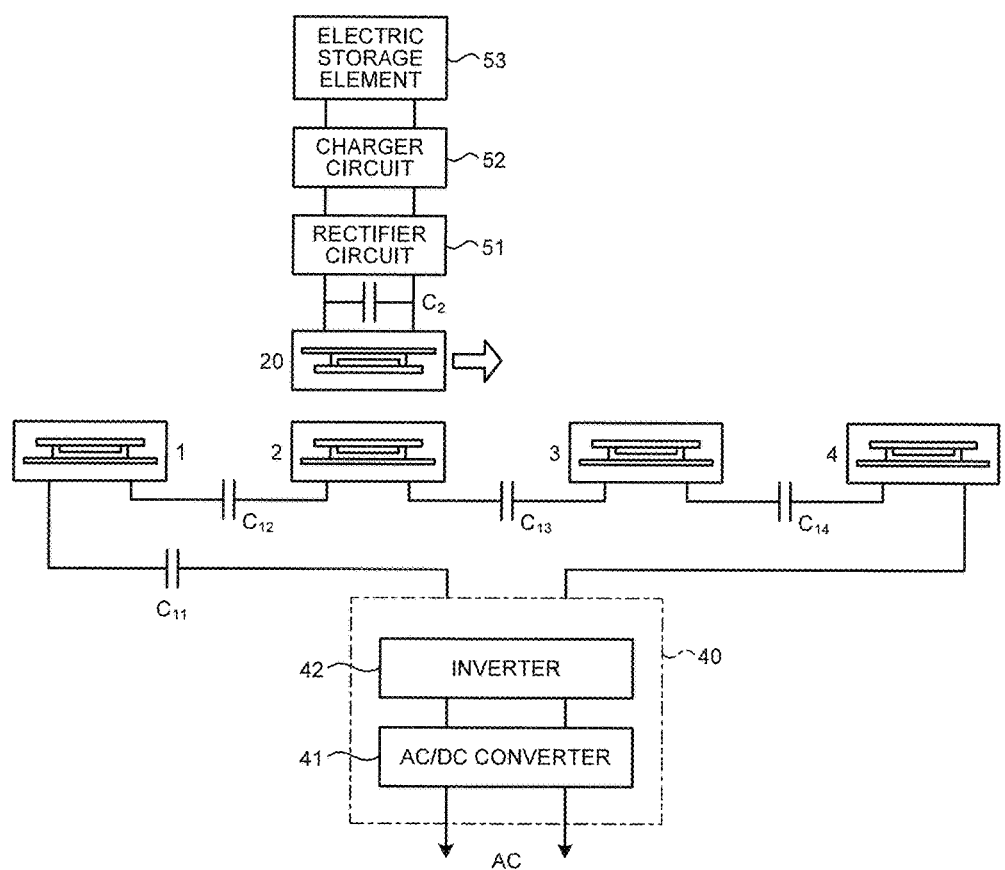
FIG. 3 is a circuit configuration diagram of the system (primary power supply transformers: in series, C1: divided, C2: in parallel) in FIG. 1.

Alternatively, as shown in FIG. 3, the primary series capacitor C1 can be divided into C11, C12, C13, and C14 to connect in series between the high-frequency power source 40 and the primary power supply transformer 1, between the primary power supply transformer 1 and the primary power supply transformer 2, between the primary power supply transformer 2 and the primary power supply transformer 3, and between the primary power supply transformer 3 and the primary power supply transformer 4, respectively.

In this case, the capacitances of C11, C12, C13, and C14 are set such that C11=C12=C13=C14=4C1 and C1 is defined by the expression (2).

Figure 4:
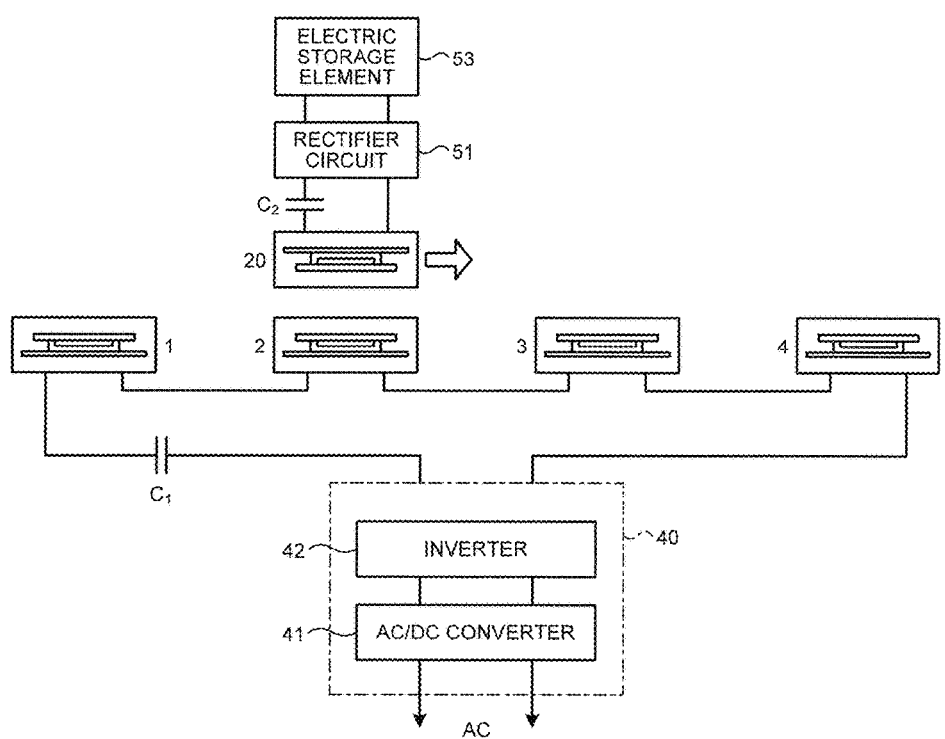
FIG. 4 is a circuit configuration diagram of the system (primary power supply transformers: in series, C1: single, C2 in series) in FIG. 1.

FIG. 4 shows a circuit in which the secondary resonance capacitor C2 of the vehicle is connected in series between the secondary power supply transformer 20 and the rectifier circuit 51. In this case, the capacitance of the secondary resonance capacitor C2 is defined by the expression (1) so as to form a series resonance circuit on the secondary side.

The primary series capacitor C1 is defined by the expression (3) so as to form a series resonance circuit on the primary side.

$$C_1 = \frac{1}{\omega^2 L_1}.$$ [Expression 3]

where L1: primary-side self-inductance.

Thus, in such a "primary-series, secondary-series capacitor type" in which the series capacitor C1 is connected to the primary side and the series resonance capacitor C2 is connected to the secondary side, by driving the inverter 42 of the primary high-frequency power source 40 at a constant voltage, the secondary rectifier circuit 51 outputs a constant current. This makes it possible to connect the rectifier circuit 51 and the electric storage element 53 without the charger circuit to charge the electric storage element 53.

Figure 5:
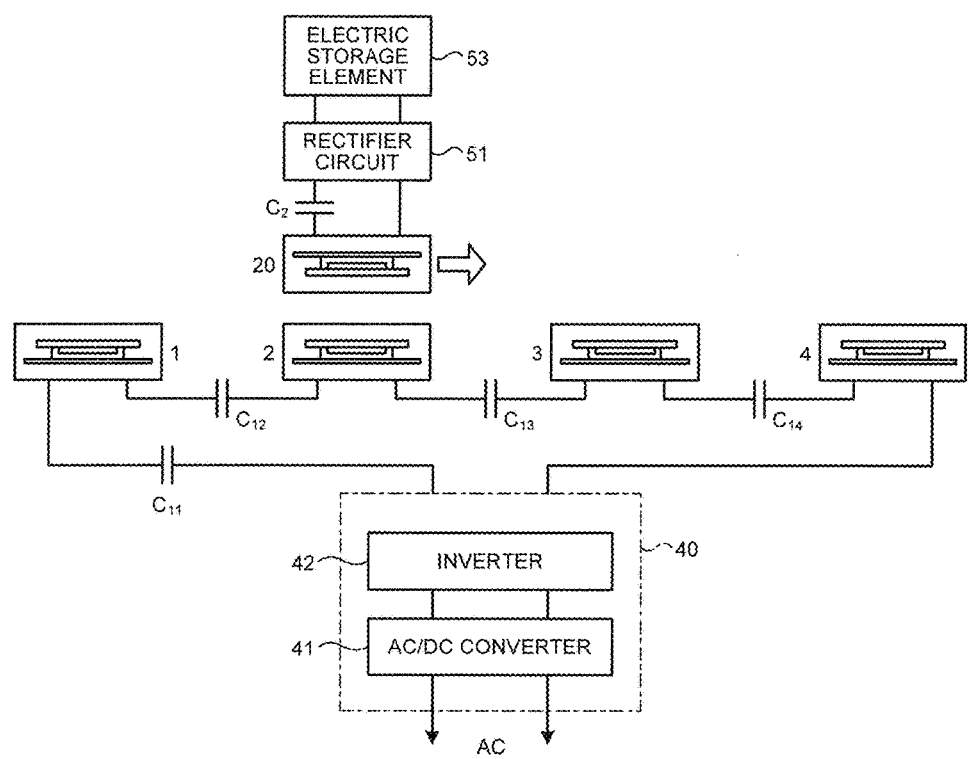
FIG. 5 is a circuit configuration diagram of the system (primary power supply transformers: in series, C1: divided, C2: in series) in FIG. 1.

Alternatively, the primary series capacitor C1 in FIG. 4 can be divided into C11, C12, C13, and C14 to connect in series between the high-frequency power source 40 and the primary power supply transformer 1, between the primary power supply transformer 1 and the primary power supply transformer 2, between the primary power supply transformer 2 and the primary power supply transformer 3, and between the primary power supply transformer 3 and the primary power supply transformer 4, respectively, as shown in FIG. 5.

In this case the capacitances of C11, C12, C13, and C14 are set such that C11=C12=C13=C14=4C1 and C1 is defined by the expression (3).

Figure 6:
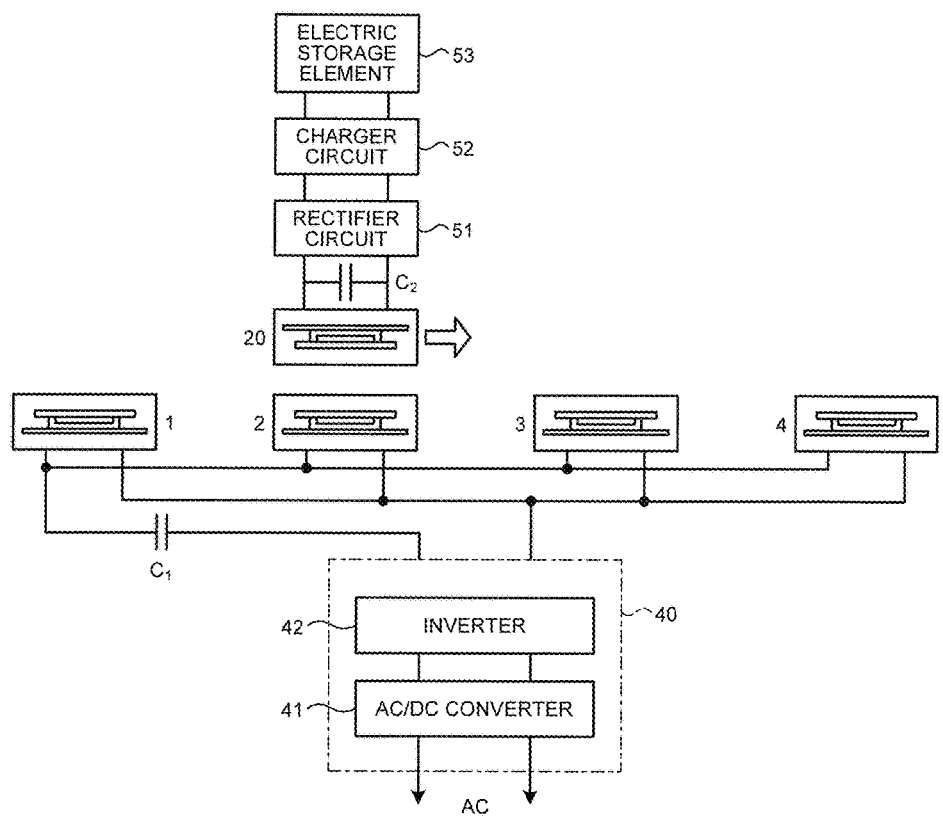
FIG. 6 is a circuit configuration diagram of the system (primary power supply transformers: in parallel, C1: single, C2: in parallel).

Further, as shown in FIG. 6, the primary power supply transformers 1, 2, 3, and 4 can be connected in parallel to the high-frequency power source 40. In this case, the single primary series capacitor C1 is connected in series between the high-frequency power source 40 and each of the primary power supply transformers 1, 2, 3, and 4.

Figure 7:
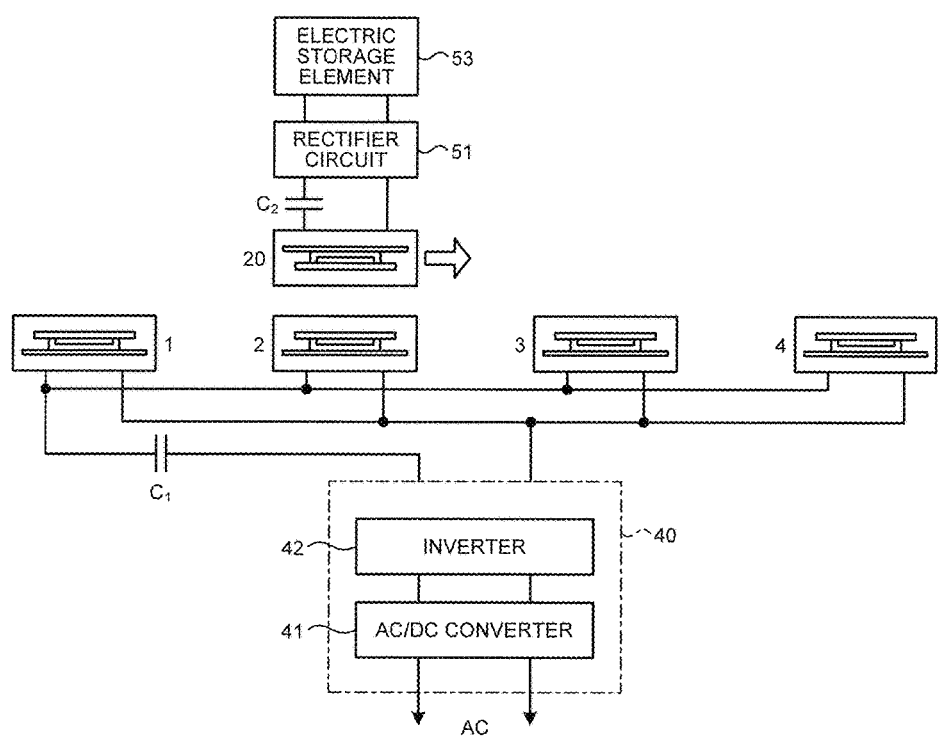
FIG. 7 is a circuit configuration diagram of the system (primary power supply transformers: in parallel, C1: single, C2: in series).

The capacitance of the primary series capacitor C1 is defined by the expression (2) so as to set the primary-side power factor to 1, when the secondary resonance capacitor C2 is connected in parallel between the secondary power supply transformer 20 and the rectifier circuit 51, as shown in FIG. 6. When the secondary resonance capacitor C2 is connected in series between the secondary power supply transformer 20 and the rectifier circuit 51, as shown in FIG. 7, the capacitance of the primary series capacitor C1 is defined by the expression (3) so as to form a series resonance circuit on the primary side.

Hence, by connecting the primary power supply transformers 1, 2, 3, and 4 in parallel to the high-frequency power source 40, flows of current can concentrate onto the primary power supply transformer 2 adjacent to the secondary power supply transformer 20. This can prevent a leakage of magnetic flux from the primary power supply transformers 1, 3, and 4 located not opposing the vehicle.

Next, a description will be made on the results of a test conducted to check the characteristics of the contactless power supply system according to the present embodiment.

Figure 8:
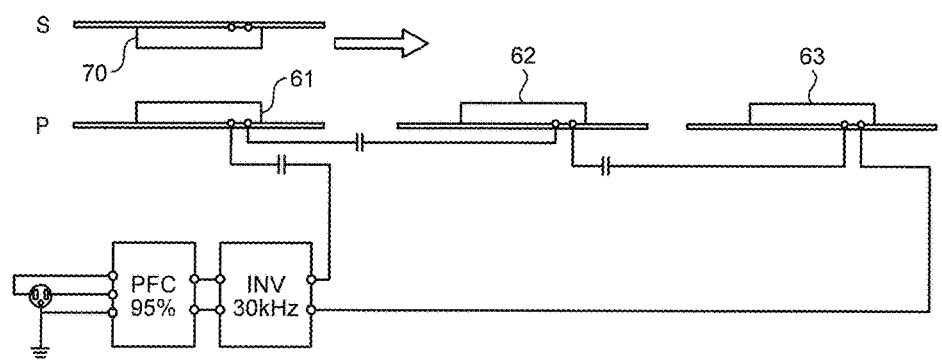
FIG. 8 shows the structure of a test apparatus according to the present embodiment.
Figure 9:
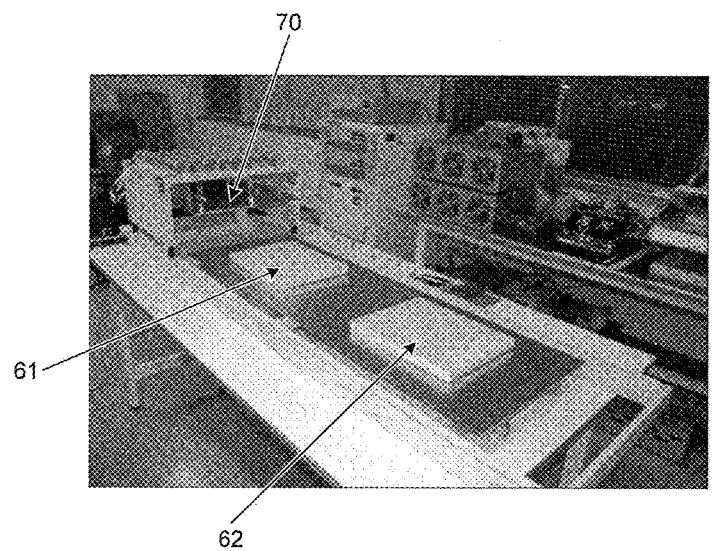
FIG. 9 shows an actual test apparatus according to the present embodiment.

In this test, variations in the secondary output and in the efficiency were measured when multiple primary power supply transformers 61, 62, and 63 were connected in series and a secondary power supply transformer 70 opposing the primary power supply transformers was moved in position while the spacing between the primary power supply transformers was changed, as shown in FIG. 8. FIG. 9 shows an actual apparatus used for the test. The primary power supply transformers and the secondary power supply transformer each include a double-sided coil having an H-shaped core around which a wire is wound, with magnetic poles in length of 300 mm and distanced by 250 mm. They are arranged in the same orientation as in FIG. 1.

Figure 10:
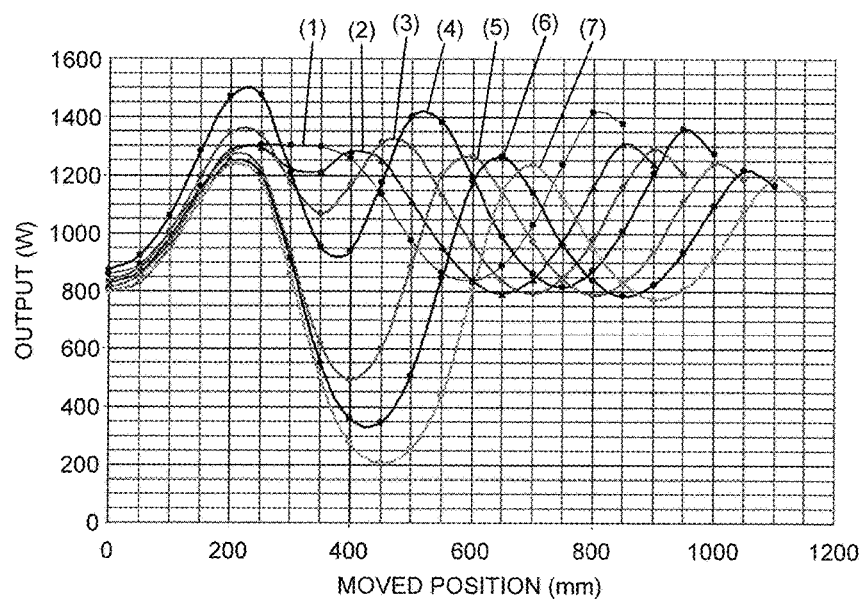
FIG. 10 is a graph showing a relationship between a spacing between the primary power supply transformers and a secondary output power according to the present embodiment.

FIG. 10 shows variations in the output of the secondary power supply transformer when the spacing between two primary power supply transformers was changed. The variations were measured under the condition that DC input is 210V, output frequency f of a high-frequency power source is 30 khz, gap between the primary power supply transformers and the secondary power supply transformer is 70 mm.

In FIG. 10 the abscissa axis indicates the moved position of the secondary power supply transformer while the vertical axis indicates the output power (W) from the secondary power supply transformer. In the graph the curve (1) represents a result when the distance between the ends of the magnetic poles of the two primary power supply transformers (hereinafter, referred to as transformer spacing) was set to 300 mm, the curve (2) represents a result when the transformer spacing was set to 350 mm, the curve (3) represents a result when the transformer spacing was set to 400 mm, the curve (4) represents a result when the transformer spacing was set to 450 mm, the curve (5) represents a result when the transformer spacing was set to 500 mm, the curve (6) represents a result when the transformer spacing was set to 550 mm, and the curve (7) represents a result when the transformer spacing was set to 600 mm.

Figure 11:
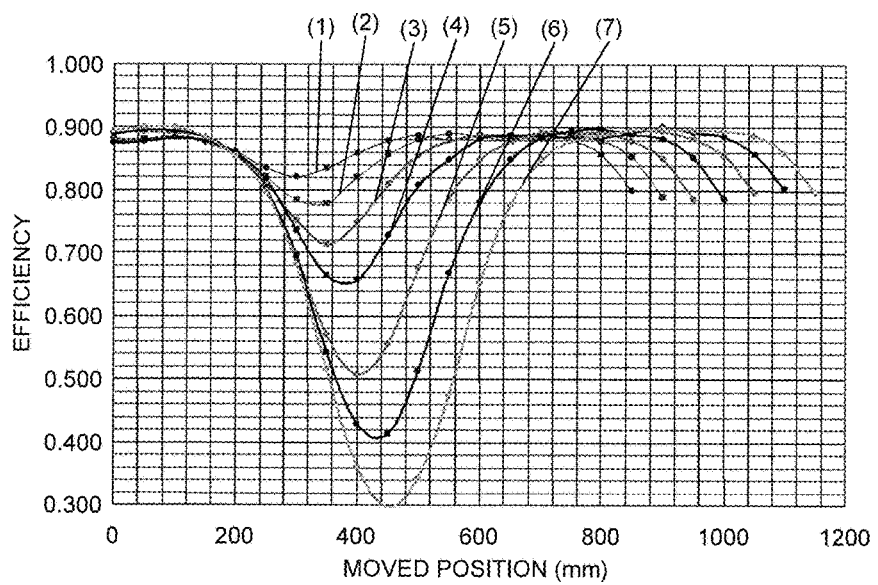
FIG. 11 is a graph showing a relationship between a spacing between primary power supply transformers and power supply efficiency according to the present embodiment.

FIG. 11 shows the power supply efficiency (ratio of input power to the primary power supply transformers and output power from the secondary power supply transformer) of FIG. 10.

The results of the measurement can confirm that even with the transformer spacing of 600 mm (that is, twice the length of the magnetic poles of the primary power supply transformer), the power supply to the secondary power supply transformer is feasible. Note that the "transformer spacing as twice the length of the magnetic poles of the primary power supply transformer" signifies that the distance from the center of the magnetic poles of one primary power supply transformer to the centers of the magnetic poles of the neighboring primary power supply transformers is three times longer than the length of the magnetic poles.

Accordingly, the contactless power supply system of the present invention can continuously supply power from the primary power supply transformers separated in a stepping stone-like form to the secondary power supply transformer unless the distance from the center of the magnetic poles of one primary power supply transformer to the centers of the magnetic poles of the neighboring primary power supply transformers exceeds 3D where D represents the size of the magnetic poles of the primary power supply transformers.

Figure 12:
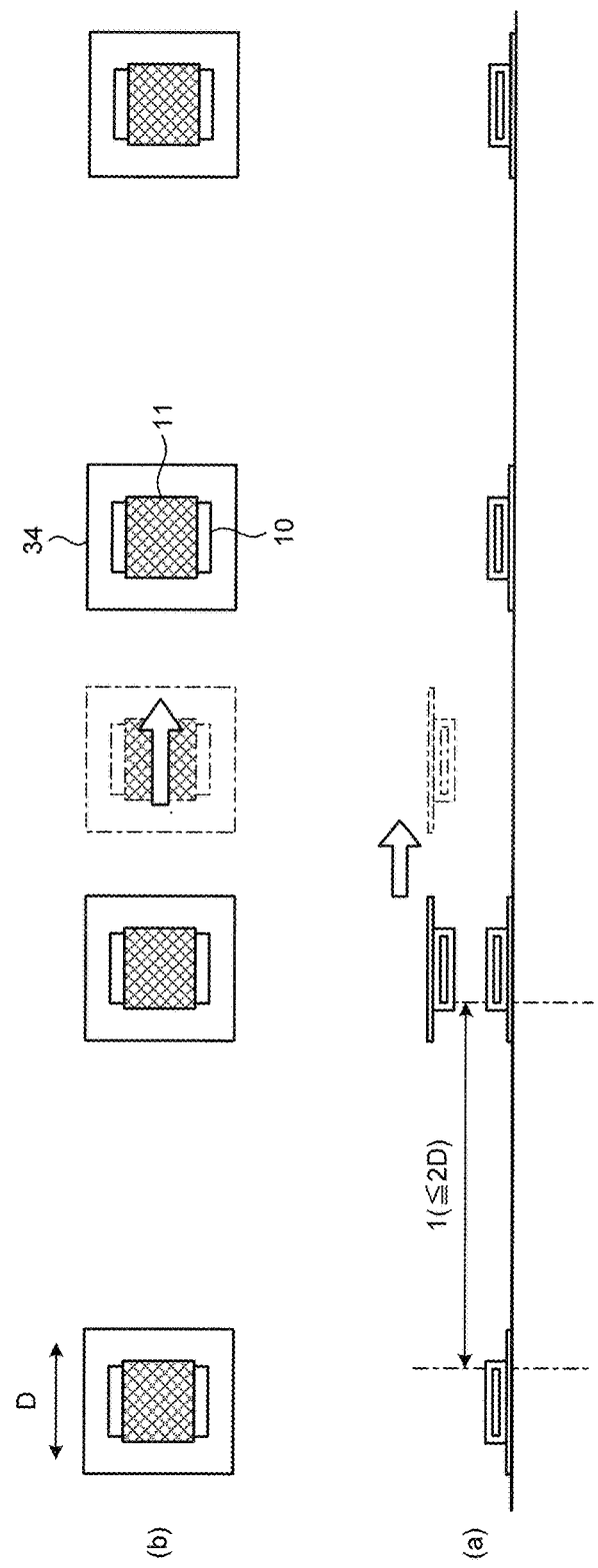
FIG. 12 shows a modification of FIG. 1 by way of example.
Figure 13:
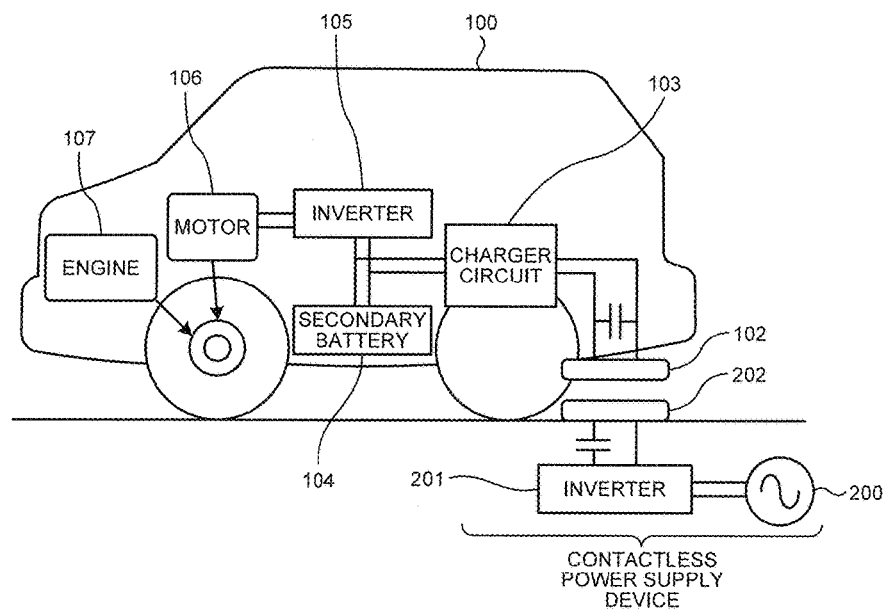
FIG. 13 shows a power supply system for a plug-in hybrid car.
Figure 14:
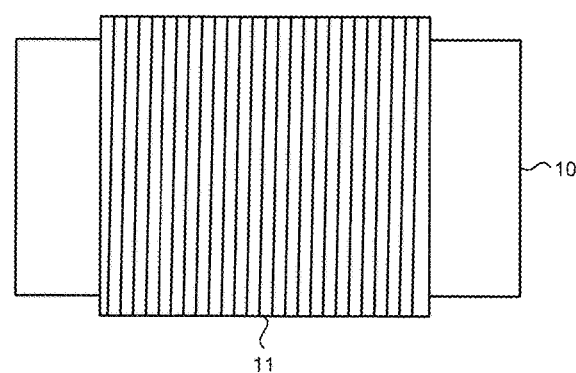
FIG. 14 shows a double-sided coil having a ferrite core plate around which a wire is wound.

Herein, the description has been made on the H-shaped core of the double-sided coil as the element of the primary power supply transformers and the secondary power supply transformer. Alternatively, a double-sided coil having the plate-like core 10 around which the wire 11 is wound, as shown in FIG. 12, can be used.

INDUSTRIAL APPLICABILITY

The contactless power supply system according to the present invention can be installed on the driving route of a mobile structure by simple work, can supply power to a running mobile structure over a longer interval, and are widely usable to supply power to running mobile structures of various types including an electric automobile or a plug-in hybrid car.

EXPLANATIONS OF LETTERS OR NUMERALS 1, 2, 3, 4 PRIMARY POWER SUPPLY TRANSFORMER
10 PLATE-LIKE CORE
11 WIRE
12 MAGNETIC POLE OF H-SHAPED CORE
20, 21 SECONDARY POWER SUPPLY TRANSFORMER
31, 32 MAGNETIC POLE
33 WIRE
34 ALUMINUM SHIELD PLATE
40 HIGH-FREQUENCY POWER SOURCE
41 AC/DC CONVERTER
42 INVERTER
51 RECTIFIER CIRCUIT
52 CHARGER CIRCUIT
53 ELECTRIC STORAGE ELEMENT
102 SECONDARY COIL (RECEIVER COIL)
202 PRIMARY COIL (TRANSMITTER COIL)
C1 PRIMARY SERIES CAPACITOR
C2 SECONDARY RESONANCE CAPACITOR
C11, C12, C13, C14 DIVIDED PRIMARY SERIES CAPACITOR

The invention claimed is:

1. A contactless power supply system for supplying power to a running mobile structure from ground in contactless manner, the system comprising:
on the ground,
a plurality of primary power supply transformers installed on a driving route of the mobile structure;
a high-frequency power source which supplies a high-frequency alternating current to the primary power supply transformers via a cable; and
a primary series capacitor connected in series to the primary power supply transformers;
on the mobile structure,
a secondary power supply transformer supplied with power from the primary power supply transformers in contactless manner;
a rectifier which rectifies an alternating current received by the secondary power supply transformer for charging; and
a secondary resonance capacitor connected in series or in parallel between the secondary power supply transformer and the rectifier, wherein
the primary power supply transformers and the secondary power supply transformer each include a double-sided coil having a core with magnetic poles at both ends and a portion between the magnetic poles around which a wire is wound, and
the primary power supply transformers and the secondary power supply transformer are installed on the driving route or on the mobile structure such that a direction of a line parallel to the magnetic poles at both ends of the core matches a traveling direction of the mobile structure; and the primary power supply transformers are separately installed with a spacing along the driving route, the spacing being set such that a distance from a center of the magnetic poles of the primary power supply transformer to a center of the magnetic poles of a neighboring primary power supply transformer is equal to or greater than D and does not exceed 3D, wherein D represents a size of the magnetic poles of the primary power supply transformers in the traveling direction.

2. The contactless power supply system according to claim 1, wherein the primary power supply transformers are connected in series to the high-frequency power source.

3. The contactless power supply system according to claim 2, wherein the primary series capacitor is connected in series between the high-frequency power source and one of the primary power supply transformers connected to the high-frequency power source.

4. The contactless power supply system according to claim 2, wherein the primary series capacitors are each connected in series between the high-frequency power source and one of the primary power supply transformers connected to the high-frequency power source and between the neighboring primary power supply transformers.

5. The contactless power supply system according to claim 1, wherein the primary power supply transformers are connected in parallel to the high-frequency power source.

6. The contactless power supply system according to claim 5, wherein the primary series capacitor is connected between the high-frequency power source and each primary power supply transformer connected in parallel to the high-frequency power source.

7. The contactless power supply system according to claim 1, wherein the core includes an H-shaped core.

* * * * *